(12) United States Patent
Wilcynski et al.

(10) Patent No.: US 10,703,485 B2
(45) Date of Patent: Jul. 7, 2020

(54) TRANSFORMABLE HEADREST FOR AIRCRAFT SEATING

(71) Applicant: The Boeing Company, Chicago, IL (US)

(72) Inventors: Paul Joseph Wilcynski, Seattle, WA (US); Sunghoon Lee, Bellevue, WA (US); Chevy Ho, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/924,481

(22) Filed: Mar. 19, 2018

(65) Prior Publication Data

US 2019/0283882 A1 Sep. 19, 2019

(51) Int. Cl.
| | | |
|---|---|---|
| *B60N 2/80* | (2018.01) | |
| *B60N 2/806* | (2018.01) | |
| *B60N 2/885* | (2018.01) | |
| *B64D 11/06* | (2006.01) | |
| *B60N 2/874* | (2018.01) | |

(52) U.S. Cl.
CPC .......... *B64D 11/0642* (2014.12); *B60N 2/874* (2018.02); *B60N 2/885* (2018.02); *B60N 2002/899* (2018.02)

(58) Field of Classification Search
CPC .... B64D 11/0642; B60N 2/885; B60N 2/874; B60N 2002/899
USPC .......... 297/188.01, 391–410, 452.37, 216.12
See application file for complete search history.

(56) References Cited

U.S. PATENT DOCUMENTS

| | | | | |
|---|---|---|---|---|
| 2,404,109 A | * | 7/1946 | Steele | B64D 17/78 297/391 X |
| 3,437,374 A | * | 4/1969 | Bennett | A47C 4/54 297/391 X |
| 4,042,791 A | * | 8/1977 | Wiseman | H04R 5/023 297/391 X |
| 4,205,878 A | * | 6/1980 | Wooten | B60N 2/99 297/391 |
| 4,637,629 A | | 1/1987 | Cummings | |
| 4,667,904 A | | 5/1987 | Herndon | |
| 4,702,519 A | * | 10/1987 | Lobanoff | B60N 2/879 297/185 |
| 4,784,352 A | | 11/1988 | Smith et al. | |
| 4,883,243 A | * | 11/1989 | Herndon | B64D 25/02 297/391 X |
| 4,899,961 A | | 2/1990 | Herndon | |
| 5,046,687 A | | 9/1991 | Herndon | |
| 5,364,164 A | * | 11/1994 | Kuranami | A47C 7/38 297/408 |
| 5,411,468 A | * | 5/1995 | Chen | B60N 2/885 297/391 X |

(Continued)

FOREIGN PATENT DOCUMENTS

| | | | | |
|---|---|---|---|---|
| DE | 19724764 C1 | * 10/1998 | ............ | B64D 11/06 |
| KR | 2017001242 U | * 4/2017 | ......... | B64D 11/0642 |

(Continued)

*Primary Examiner* — Rodney B White
(74) *Attorney, Agent, or Firm* — Coats & Bennett, PLLC

(57) ABSTRACT

A headrest assembly having at least one articulated cushion section that is deployable from a recess in a stowed position, a passenger seat comprising the headrest assembly and cushion section, as well as vehicles comprising the seat, and methods of installation are disclosed.

19 Claims, 5 Drawing Sheets

(56) References Cited

U.S. PATENT DOCUMENTS

| | | | | |
|---|---|---|---|---|
| 5,531,505 | A * | 7/1996 | Baetz | B60N 2/847 297/408 |
| 5,904,405 | A * | 5/1999 | Wu | B60N 2/885 297/391 |
| 6,158,812 | A * | 12/2000 | Bonke | B60R 16/08 297/391 |
| 6,394,544 | B1 * | 5/2002 | Bieven | B60N 2/26 297/408 X |
| 6,513,871 | B2 * | 2/2003 | Bartels | B60N 2/885 297/216.12 |
| 6,616,235 | B1 * | 9/2003 | Khavari | B60N 2/847 297/408 |
| 6,619,733 | B2 | 9/2003 | Pearson | |
| 6,692,071 | B2 * | 2/2004 | Fowler | B60N 2/4235 297/216.12 |
| 6,814,404 | B2 | 11/2004 | Jensen | |
| 7,144,083 | B2 * | 12/2006 | List | B60N 2/885 297/391 |
| 7,188,896 | B2 * | 3/2007 | Embach | B60R 7/043 297/391 X |
| 7,213,877 | B2 * | 5/2007 | Gramss | B60R 7/043 297/188.01 X |
| 7,213,884 | B2 * | 5/2007 | Flory | B60N 2/70 297/398 |
| 7,506,926 | B2 * | 3/2009 | Carine | B60N 2/885 297/391 |
| 8,911,018 | B2 * | 12/2014 | Gaither | B60N 2/885 297/391 |
| 8,967,538 | B2 * | 3/2015 | Guering | B64D 10/00 244/118.5 |
| 8,985,622 | B1 * | 3/2015 | Cannon | B60R 21/231 297/391 X |
| 8,985,693 | B2 | 3/2015 | Purpura et al. | |
| 9,216,676 | B1 * | 12/2015 | Reyes Luna | B60N 2/986 |
| 9,283,876 | B2 * | 3/2016 | Dinger | B60N 2/80 |
| 9,481,277 | B1 * | 11/2016 | Ruelas | B60N 2/885 |
| 10,023,090 | B2 * | 7/2018 | Muldowney | B60N 2/874 |
| 10,099,591 | B2 * | 10/2018 | Flynn | B60N 2/868 |
| 10,239,432 | B2 * | 3/2019 | Subat | B60N 2/879 |
| 10,252,657 | B2 * | 4/2019 | Lessard | B60N 2/885 |
| 2001/0040401 | A1 * | 11/2001 | Lin | B60N 2/885 297/397 |
| 2002/0084686 | A1 * | 7/2002 | Takata | B60N 2/856 297/408 |
| 2005/0253440 | A1 * | 11/2005 | Kotani | B60N 2/885 297/410 |
| 2009/0121523 | A1 | 5/2009 | Johnson | |
| 2009/0302660 | A1 * | 12/2009 | Karlberg | B60N 2/885 297/404 |
| 2010/0171349 | A1 * | 7/2010 | Dellanno | B60N 2/888 297/216.12 |
| 2012/0212025 | A1 * | 8/2012 | Schroeder | B60N 2/874 297/391 |
| 2013/0106163 | A1 | 5/2013 | Purpura et al. | |
| 2013/0134760 | A1 * | 5/2013 | Sutton | B29C 45/1671 297/391 |
| 2013/0341367 | A1 | 12/2013 | Purpura | |
| 2015/0197170 | A1 * | 7/2015 | Obukhov | B60R 21/207 297/391 |
| 2015/0314714 | A1 * | 11/2015 | Miyata | B60N 2/5883 297/391 |
| 2015/0375648 | A1 * | 12/2015 | Navarro | B60N 2/80 297/391 |
| 2016/0100250 | A1 * | 4/2016 | Baskin | H04R 1/02 297/217.4 |
| 2018/0290573 | A1 * | 10/2018 | Faruque | B60N 2/809 |

FOREIGN PATENT DOCUMENTS

| | | | | |
|---|---|---|---|---|
| WO | WO-2017020877 | A1 * | 2/2017 | ............. B60N 2/874 |
| WO | WO-2017118868 | A1 * | 7/2017 | ............. A47C 7/38 |
| WO | WO-2018185114 | A1 * | 10/2018 | ......... B64D 11/0647 |

* cited by examiner

TRANSFORMABLE HEADREST FOR AIRCRAFT SEATING

TECHNOLOGICAL FIELD

The present disclosure relates generally to the field of transport seating. More specifically, the present disclosure relates to the field of passenger seats having headrest assemblies.

BACKGROUND

Vehicle transport seats, including commercial airline seats, are often occupied by travelers for extended periods of time. Even though many transport seats recline to an extent, seating density on commercial aircraft often prevents sufficient reclining of seat backs for the seat occupant to acquire a restful sleep.

Several options may exist that, to an extent, may incompletely assist the restful sleep for a seated occupant of a commercial transport seat. For example, passengers seated proximate to a window may be able to prop their head against an interior side wall. However, to gain access to such bulkhead support, passengers must contort their body partially out of the seat such that a comfortable sleeping position is not attained through the use of the seat itself.

Further, passengers may attempt the use of discrete neck pillows that may allow a degree of comfort to a passenger in search of sleep. However, such a personal, discrete sleep pillow is not useful in providing neck support to a reclining passenger, especially if the natural tendency of a sleeping passenger in a seated position leads to the relaxing of neck muscles that then allow a passenger's head to fall to a more horizontal position, or otherwise leads to the disengagement from the discrete pillow of the passenger's head, frustrating useful support of the head and neck that could be provided by such a pillow. Particularly on extended flights, it may be desirable for a passenger to vary resting positions. With discrete neck pillows it may be difficult or impossible to significantly vary resting positions.

Airlines and seat manufacturers must balance weight, cost, quality, durability and overall aesthetic yet simple design to afford a passenger desired comfort, especially on flights of long duration. However, to achieve varied positions at rest while in a passenger seat, additional cushions may be needed, requiring additional cost, weight, etc. to a seat manufacturer and/or an airline.

SUMMARY

An aspect of the present disclosure is directed to a seat including a headrest (also referred equivalently hereto as a "headrest assembly") in communication with the seat. The headrest includes a first outer cushion section, a second outer cushion section, a recess located between the first outer cushion section and the second outer cushion section, and an articulated central cushion section. The articulated central cushion section is positioned in the recess in a stowed state; and the articulated central cushion section is positioned out of the recess in a deployed state.

Another aspect of the present disclosure is directed to a headrest for a seat, with the headrest including a plurality of cushion sections. The headrest further includes at least one cushion section having a first position in a stowed state and also having at least one second position in a deployed state; and wherein the second position is different from the first position.

Another aspect of the present disclosure is directed to a headrest for a passenger seat. The headrest includes a first outer cushion section, a second outer cushion section, a recess located between the first outer cushion section and the second outer cushion section, and an articulated central cushion section, said recess dimensioned to at least partially house the articulated central cushion section. The articulated central cushion section is positioned in the recess in a stowed state, and the articulated central cushion section is positioned out of the recess in a deployed state.

In a further aspect, a method is disclosed including installing a headrest assembly to a passenger seat, with the headrest assembly including a first outer cushion section, a second outer cushion section, a recess located between the first outer cushion section and the second outer cushion section, and an articulated central cushion section. The articulated central cushion section is positioned in the recess in a stowed state; and the articulated central cushion section is positioned out of the recess in a deployed state In another aspect, a method is disclosed including installing a seat into a vehicle. The seat includes a headrest including a first outer cushion section, a second outer cushion section, a recess located between the first outer cushion section and the second outer cushion section, and an articulated central cushion section. The articulated central cushion section is positioned in the recess in a stowed state; and the articulated central cushion section is positioned out of the recess in a deployed state.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
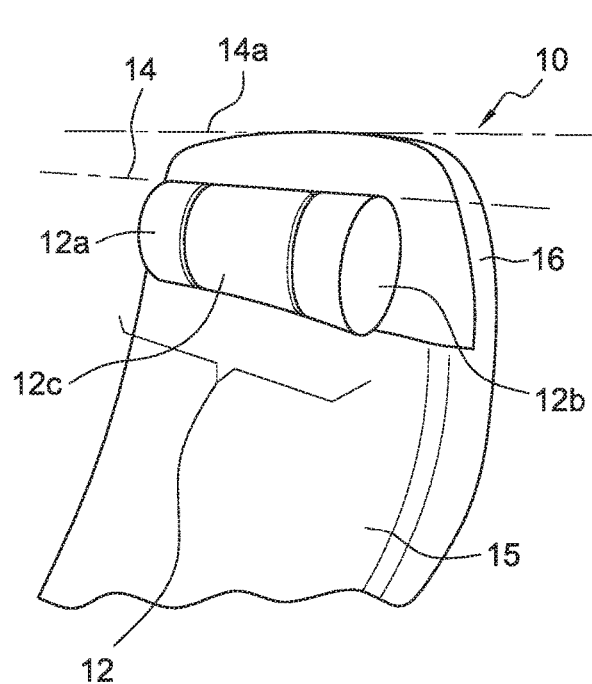
Figure 2:
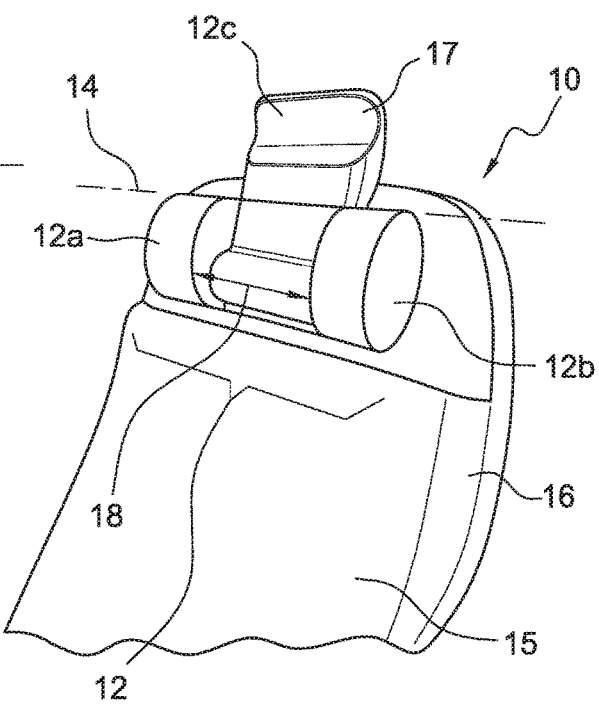
Figure 3:
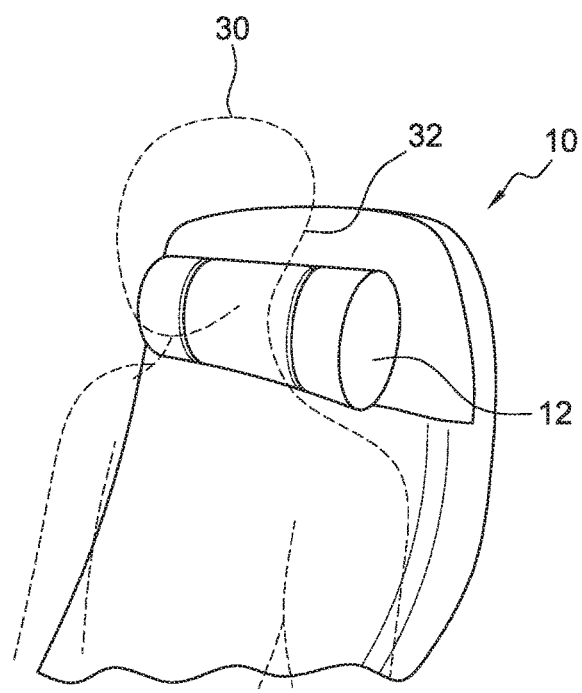
Figure 4:
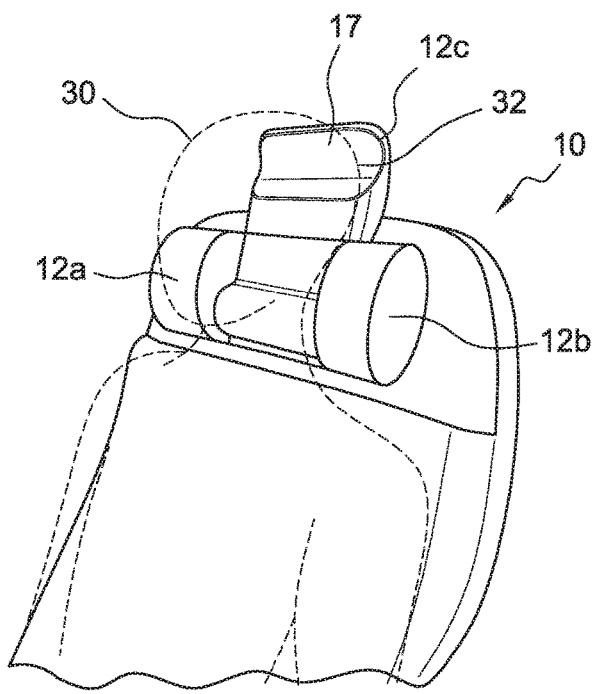
Figure 5:
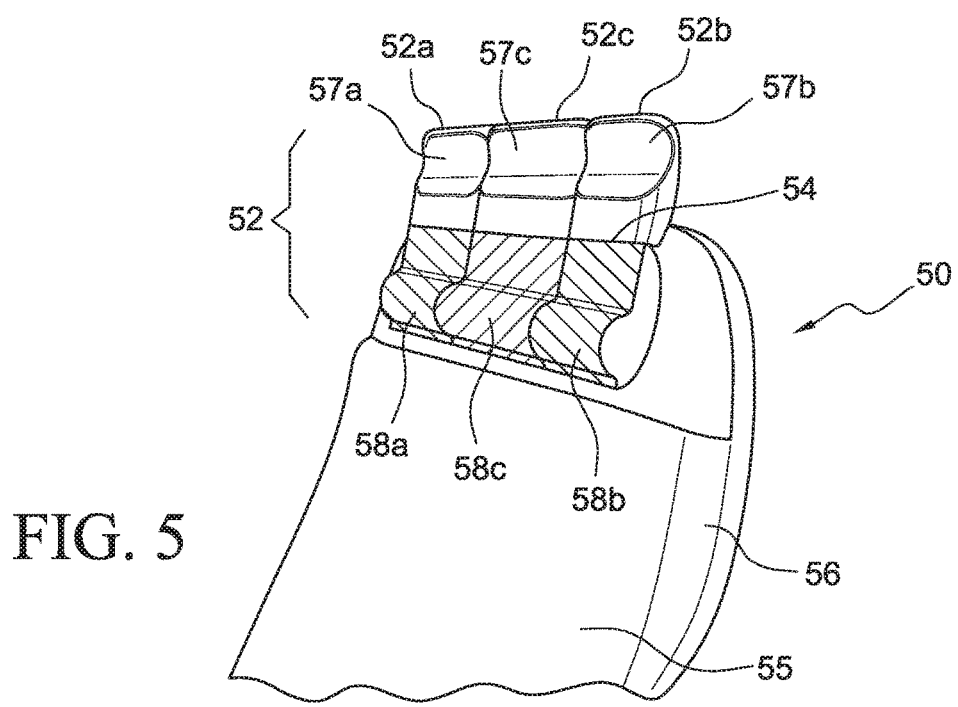
Figures 6A, 6B:
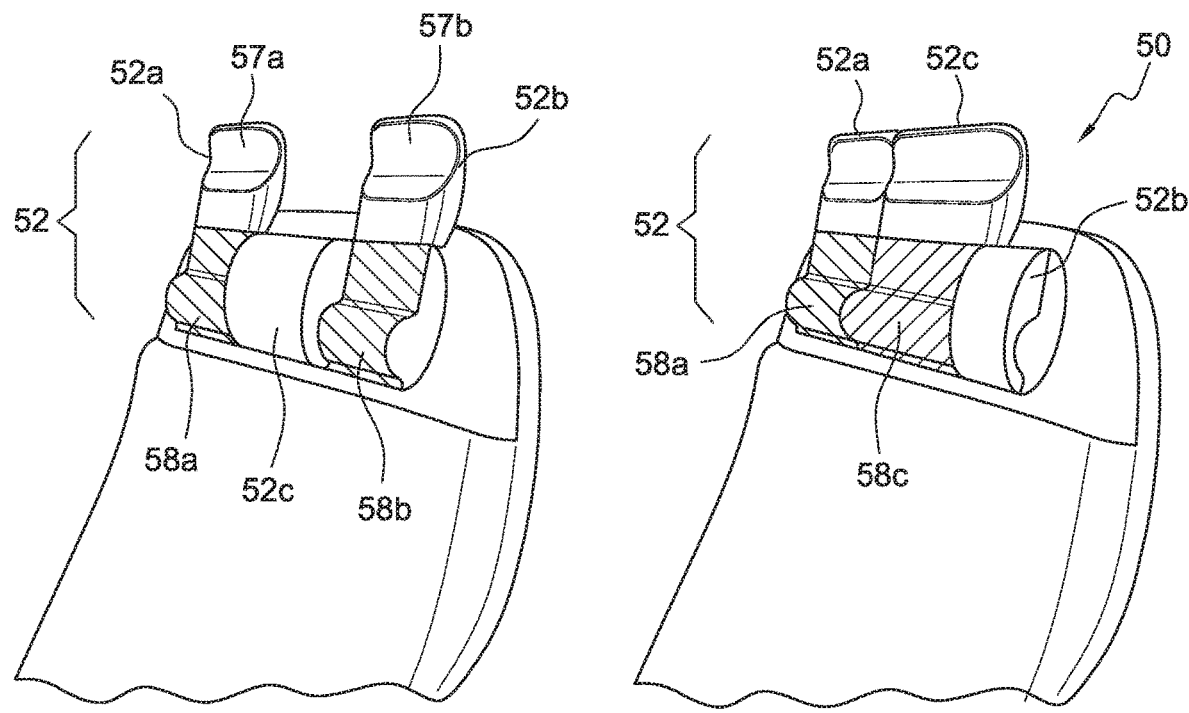
Figure 7:
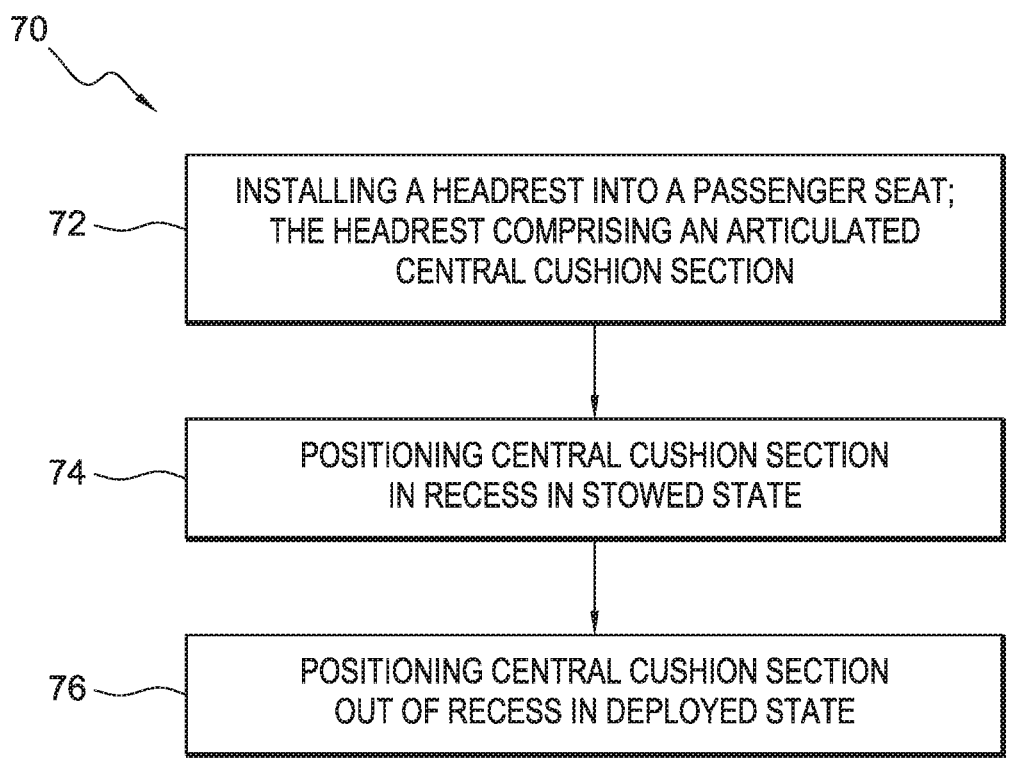
Figure 8:
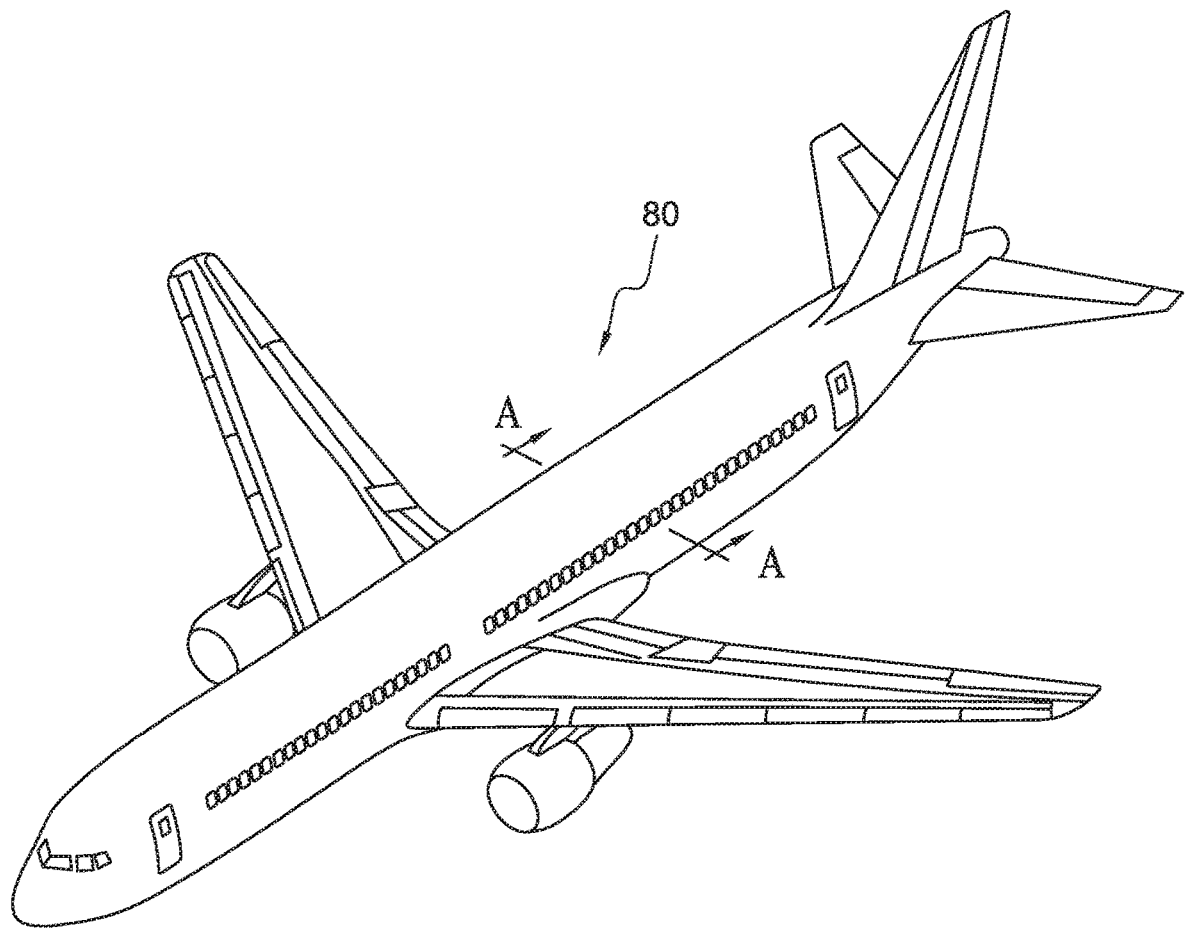

Having thus described variations of the disclosure in general terms, reference will now be made to the accompanying drawings, which are not necessarily drawn to scale, and wherein:

FIG. 1 is a perspective view of a headrest and seat according to aspects of the present disclosure, with cushion sections of the headrest in a stowed configuration;

FIG. 2 is a perspective view of a headrest and seat according to aspects of the present disclosure, with a central cushion section in a deployed configuration;

FIG. 3 is a perspective view of a passenger in a seat according to aspects of the present disclosure, showing a passenger's head resting proximate to the headrest with the headrest cushion sections in a stowed state;

FIG. 4 is a perspective view of a passenger in a seat according to aspects of the present disclosure, showing a passenger's head and neck resting proximate to the headrest with the central cushion section of the headrest shown in a deployed state;

FIG. 5 is a perspective view of a headrest and seat according to aspects of the present disclosure, with central and outer headrest cushion sections in a deployed configuration;

FIGS. 6A and 6B are perspective views of a headrest and seat according to aspects of the present disclosure, with outer headrest cushion sections in different configurations;

FIG. 7 is a flowchart outlining methods according to aspects of the present disclosure;

FIG. 8 is a perspective view of an aircraft; and

Figure 9:
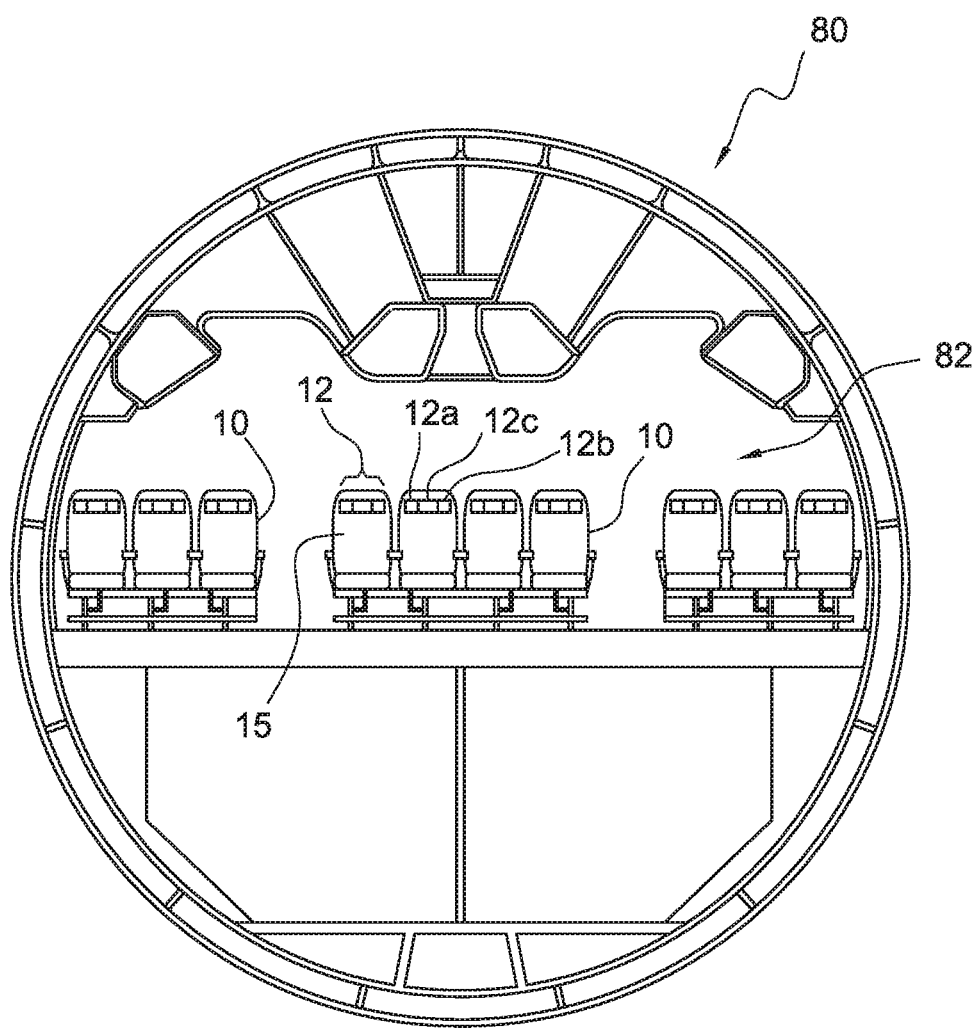

FIG. 9 is a cross-sectional view of the aircraft of FIG. 8.

DETAILED DESCRIPTION

Aspects of the present disclosure provide a resting support system, particularly useful for transport passengers seated on trips of significant duration. The present aspects afford improved comfort and support for passengers seated for any length of time, including short and long seated durations. The seat comprising headrests in the disclosed support systems provide enhanced support and comfort through the customizable positioning of headrest cushion segments, including sections that articulate between stowed and deployed positions. According to aspects of the present disclosure, at least one of the headrest cushion sections is articulated. The term "articulated" as used herein refers to movement of an object relative to another object at a point of attachment, (including, e.g., via joints, etc.), such that the articulated object can move (e.g., pivot, etc.) with respect to adjacent objects, or such that one portion of the articulated object can move with respect to another portion of the articulated object. According to present aspects, headrests for passenger seats are disclosed that comprise a plurality of headrest cushion sections, with at least one cushion section being an articulated cushion section that is moveable for the purpose of pivoting or rotating about a joint from a first position (e.g., a stowed position), to a second position e.g., a deployed position).

In the stowed position, the headrest cushion sections that are integrated into passenger seats are configured to provide support to a seated passenger in the head and neck area. The outer surfaces of the headrest cushion sections can comprise a cover material of any suitable material, including materials shaped into resilient and durable form including, for example, treated natural product materials such as leathers, cloths, etc., as well as synthetic materials including, polymeric materials including, for example, polymeric materials including, for example, plastics, etc.

The cover materials can cover and contain further support materials. Such support material forming or contained within the headrest cushion sections includes, for example, open-cell foam, closed-cell foam, etc. In certain aspects, the support material may be homogeneous and comprise a single material. In further aspects, the support material may be heterogeneous and comprise a plurality of different materials. When the support material contains a plurality of different materials, such heterogeneous materials can together form or otherwise be disposed within the headrest cushion sections as desired, for example, to provide their characteristics to the headrest cushions to perform particular functions. For example, if heterogeneous materials in the support material of the headrest cushion sections vary, for example, in density, the support material having the greatest density can be located within the headrest cushion segment toward the portion of the headrest that will contact a passenger head (and, for example, provide firm support to the back of a passenger's head or neck) when a cushion section is in a stowed state.

As stated above, according to aspects of the present disclosure, the foam selected for use in the manufacture of the disclosed headrest, and seats comprising such headrests may be open cell, closed cell or some other form of foam. The foam and type of foam selected for inclusion in the present headrests will depend on the desired characteristics of headrest cushions. For example, solid closed cell foams are generally more dense, semi-impermeable, and restrict flow of air and are less water absorbent. Typical closed cell foams include foams comprising at least one of: ethylene propylene diene monomer (EPDM) rubber, nitrile rubbers (e.g., Buna-N, polyvinyl chloride/nitrile butadiene rubber), fluoroelastomers; polyvinyl chloride foam, etc. Solid open cell foams are generally semi-permeable to air and moisture, and are "softer" and less dense than closed cell foams.

Typical solid open cell foams include foams made from natural rubber, neoprene, etc. In addition, microcell urethane foams known for quick recovery from compression and other urethane foams (e.g., polyurethane foams) can be used to make the cushioning material that is incorporated into the presently disclosed headrests. The foam materials selected for use in the presently disclosed headrest cushions can have any desired density, within reason. Further, materials can be selected and used in combination to afford the headrest cushions varying "zones" of varying density. In addition, aspects of the present disclosure include the use of non-foam cushioning materials that are lightweight and durable including elastomeric materials and/or materials that can include springs, honeycomb configuration, or even cushioning material that is inflatable, or otherwise includes one or more inflatable chambers.

According to present aspects, as the cushion section is articulated from a stowed state to a deployed state, the support material having the greatest density (e.g., support material having greater density) can serve a second function. As the cushion section is lifted away from the stowed state in the headrest assembly and rotated to a deployed state, the headrest cushion section itself will engage the seat and/or a top section of the headrest (e.g., at the point of attachment of the cushion section to the headrest assembly, etc.) in a way that provides an amount of resistance until the cushion section being deployed attains the desired deployed position. The greater density of the support material contained within the headrest cushion section can be compressed and offer support and stability to the cushion section during deployment from the stowed state, as well as retain such support and stability. Such "stability" refers to a condition including the cushion retaining its desired deployment position in the deployed state.

When a cushion section is in a deployed state, an inner surface of the cushion section that is not visible or otherwise exposed when the cushion section is stowed, becomes exposed and can receive and cushion the back of the head of a passenger seated in the seat. Therefore, the cushion section can possess different levels of support and/or cushioning to a passenger's head depending on whether the cushion section is in the stowed or deployed state. That is, the inner surface of the cushion section may provide greater cushioning and less support than the outer surface of the same cushion section. If the cushion comprises a covering material, the covering and the contained support material covered by the covering material can be selected to afford the headrest cushion section varied and desired characteristics (e.g., supporting and cushioning characteristics) across various areas or "zones" of the cushion section (e.g., inner and outer regions of the cushion sections that include inner and outer surfaces, etc.).

According to aspects of the present disclosure, FIG. 1 shows a portion of a passenger seat 10 having a headrest assembly 12. As shown in FIG. 1, the headrest assembly 12 includes outer headrest cushion sections 12a and 12b, as well as a central headrest cushion section 12c. As shown in FIG. 1, the central headrest cushion segment 12c of headrest assembly 12 is in a stowed position, with the substantial area of the central headrest cushion section 12c of headrest assembly 12 positioned proximate to outer headrest cushion sections 12a, 12b. In the stowed position (equivalently and interchangeably referred to herein as a "stowed state"), as shown in FIG. 1, each of headrest cushion sections 12a, 12b, and 12c substantially shares a common "topline" 14 (represented in FIG. 1 as a broken line 14) extending across the top, or "upper" end of the perimeter of the headrest assembly 12. As further shown in FIG. 1, the passenger seat 10 includes a seat cushion 15 and a seat back 16 that houses the seat cushion 15. As still further shown in FIG. 1, and according to one aspect, the common "topline" 14 of the headrest cushion sections 12a, 12b and 12c, when in the stowed state, occurs below the upper perimeter or topline 14a (illustrated in FIG. 1 as a broken line 14a) of the seat back 16 to which the headrest assembly 12 is attached.

FIG. 2 shows the further aspects of the present disclosure including the passenger seat 10 of the type shown in FIG. 1. In FIG. 2, the headrest again includes outer headrest cushion sections 12a and 12b, as well as a central headrest cushion section 12c. FIG. 2 shows the central headrest cushion section 12c now lifted up and rotated "back" (from the stowed position shown in FIG. 1), to a deployed position (equivalently and interchangeably referred to herein as a "deployed state"). In the illustrated deployed position shown in FIG. 2, the central headrest cushion section 12c is now predominantly located above the "topline" 14 extending across the top, or upper end of the perimeter of the headrest assembly 12. In the deployed state, a recess 18 in the headrest assembly 12 is now visible. The recess 18 is shown as being dimensioned to substantially "house" the central headrest cushion section 12c in the headrest assembly 12 when the central headrest cushion section 12c is in the stowed state (e.g., as shown in FIG. 1). According to the present disclosure, the term "house" refers to the ability of a first structure to at least partially dimensionally receive at least a portion of a second structure, such that at least a portion of the second structure dimensionally fits into or is otherwise brought into disengageable contact with the first structure.

In the deployed position, as shown in FIG. 2, the central headrest cushion section 12c includes a central cushion section inner surface 17 that becomes exposed, along with the recess 18, when the central headrest cushion section 12c is lifted up from a stowed position and rotated "back" or "up," and "away" from the seat back to a deployed position.

FIG. 3 shows the passenger seat 10 of FIGS. 1 and 2 with a passenger 30 seated in the passenger seat 10. The headrest assembly 12 of the passenger seat 10, though partially obstructed from view, is in the stowed position, as shown in FIG. 1. As shown in FIG. 3, the central headrest cushion segment 12c of headrest assembly 12 is in a stowed position, with the substantial area of the central headrest cushion section 12c of headrest assembly 12 positioned proximate to outer headrest cushion sections 12a, 12b. In the stowed position, as shown in FIGS. 1 and 3, each of headrest cushion sections 12a, 12b, and 12c substantially share a common "topline" 14 extending across the top, or upper end of the perimeter of the headrest assembly 12. As shown in FIG. 3, in the stowed position, the passenger head 32 of passenger 30 is resting against and is otherwise supported at the base of the head and neck area by central headrest cushion 12c (obstructed from view in FIG. 3) of the headrest assembly 12 of passenger seat 10.

As shown in FIG. 4, passenger seat 10 as shown in FIGS. 1-3, is occupied by passenger 30. The central headrest cushion section 12c of headrest assembly 12 (also shown in FIGS. 1, 2 and 3) is now in a deployed position as also shown in FIG. 2. As shown in FIG. 4, the central headrest cushion section 12c is now lifted up and rotated "back" or "up" (from the stowed position shown in FIGS. 1 and 3), to a deployed position. In the illustrated deployed position shown in FIGS. 2 and 4, the central headrest cushion section 12c is now predominantly located above the "topline" 14 extending across the top, or upper end of the perimeter of the headrest assembly 12. In the deployed position, as shown in FIGS. 2 and 4, the central headrest cushion section 12c includes a central cushion section inner surface 17 that becomes exposed, along with the recess 18, when the central headrest cushion section 12c is lifted up and rotated "back" or "up" to a deployed position. In this deployed position, the head or neck 32 of passenger 30 is shown in FIG. 4 resting against recess 18 (shown in FIGS. 2 and 4 such that the outer headrest cushion sections 12a and 12b serve to cradle the passenger neck and head 32 laterally, while the passenger head 32 of passenger 30 contacts and is also otherwise supported and also cushioned by the inner surface 17 of central headrest cushion section 12c of headrest assembly 12.

While FIGS. 1-4 show a headrest assembly 12 including central headrest cushion section 12c that can be articulated from a stowed position to a deployed position, further aspects of the present disclosure contemplate headrests for passenger seats where a plurality of headrest cushion sections can be articulated from a stowed to a deployed position. As shown in FIG. 5, passenger seat 50 includes a headrest assembly 52. As shown in FIG. 5, the headrest assembly 52 includes outer headrest cushion sections 52a and 52b, as well as a central headrest cushion section 52c. FIG. 5 shows the central headrest cushion section 52c, and the outer headrest cushion sections 52a and 52b lifted up and rotated "back" or "up" (from a stowed position, not shown), to a deployed position. In the illustrated deployed position shown in FIG. 5, outer headrest cushion sections 52a and 52b, as well as a central headrest cushion section 52c are all three now predominantly located above the "topline" 54 extending across the top or upper end of the upper perimeter of the headrest 52. In the deployed state, recesses 58a, 58b and 58c in the headrest 52 are now visible.

As shown in FIG. 5, the recess areas 58a, 58b and 58c are shown as being dimensioned to substantially "house" corresponding outer headrest cushion sections 52a and 52b, as well as a central headrest cushion section 52c, respectively, when the outer headrest cushion sections 52a and 52b, as well as a central headrest cushion section 52c are in the stowed state (not shown in FIG. 5). In the deployed position, as shown in FIG. 5, the outer headrest cushion sections 52a and 52b include outer headrest cushion section inner surfaces 57a and 57b, and central headrest cushion section 52c includes central headrest cushion inner surface 57c. Recesses 58a, 58b and 58c are shown in FIG. 5 as being dimensioned to substantially "house" the headrest cushion sections 52a, 52b and 52c, respectively, when the headrest cushion sections 52a, 52b and 52c are in the stowed state (not shown in FIG. 5).

According to aspects of the present disclosure, the headrest cushions in the deployed state shown in FIG. 5, can provide an amount of support (e.g., lateral neck support) to a passenger's head and neck when a passenger is seated in a passenger seat of the type shown in FIG. 5, although more and potentially better lateral neck support is thought to be provided to a passenger seated in a passenger seat having a deployed headrest configuration similar to that shown in FIGS. 2 and 4. That is, if desired, the recesses 58a, 58b and 58c in the headrest assembly 52 shown in FIG. 5, can be dimensioned and angled to foster a desired degree of cradling of a passenger's head. Further, the orientation of all headrest cushions in the deployed state may afford a degree of added privacy to a passenger seated in a seat having such a deployed headrest configuration due to the extending of the headrest assembly and their cushions beyond a height often provided by conventionally dimensioned headrests of passenger transport seats.

FIGS. 6A and 6B show the passenger seat 50 shown in FIG. 5, with headrest cushion sections in varying deployed and stowed positions. As shown in FIG. 6A, the headrest assembly 52 includes outer headrest cushion sections 52a and 52b, as well as a central headrest cushion section 52c. FIG. 6A shows the outer headrest cushion sections 52a and 52b lifted up and rotated "back" (from a stowed position, not shown), to a deployed position. The central headrest cushion section 52c is shown in the "stowed position. In this deployed state for outer headrest cushion sections 52a and 52b, recesses 58a and 58b in the headrest 52, respectively, are now visible. In the deployed position, as shown in FIG. 6A, the outer headrest cushion sections 52a and 52b include outer headrest cushion section inner surfaces 57a and 57b that are now also visible.

As shown in FIG. 6B, the headrest assembly 52 includes outer headrest cushion sections 52a and 52b, as well as a central headrest cushion section 52c. FIG. 6B shows the outer headrest cushion section 52a and central headrest cushion section 52c lifted up and rotated "back" or "up" (from a stowed position, not shown), to a deployed position. Outer headrest cushion section 52b is shown in the "stowed position. In this deployed state for outer headrest cushion section 52a and central headrest cushion section 52c, recesses 58a and 58c, respectively in the headrest 52 are now visible.

According to aspects of the present disclosure, some of which are illustrated in FIGS. 1-5, 6A and 6B, a headrest cushion section, or a plurality of headrest cushion sections can be moved from a stowed first position to a second position. The second position can be the fully deployed position as shown in the FIGS. 2, 4, 5, 6A and 6B. The second position can also be any position as desired (e.g., the "desired position") by an occupant or an attendant, or maintenance or repair personnel, etc., with the desired position representing an angle that is formed between the stowed first position and the fully deployed position of a headrest cushion. While the illustrations shown in FIGS. 1-5, 6A and 6B show a stowed first position of about 0°, and a fully deployed position of about 180°, though not illustrated, aspects of the present disclosure further include deploying one or more headrest cushion sections from a stowed position to any desired position that can represent an angle in between, for example, an angle ranging from more than 0° to about 180° (e.g., if the topline of the headrest assembly is below the topline of the seat, since the seat back would likely restrict deployed positioning of the headrest beyond about 180°).

According to further aspects not presently illustrated, if the topline of the headrest assembly is about equivalent to the topline of the seat or even above the topline of the seat back, one or more headrest cushion sections may be deployed from the stowed position to a desired deployed position that exceeds 180°. For example, in this aspect, the desired position of deployment of one or more headrest cushion sections can be represented by an angle ranging from more than 0° to at least about 270°.

To retain one or more headrest cushions in a deployed state in a desired position, the headrest cushion section or cushion sections being deployed can comprise at least one internal or external mechanism including, for example, at least one of a locking feature and locking mechanism designed to retain a deployed headrest cushion section in a desired position. According to aspects of the present disclosure, a locking feature or locking mechanism can also require no additional hardware, but can retain one or more headrest cushion section in a desired position of deployment (e.g., to a deployed state) by frictional forces created, for example, by one headrest cushion section frictionally engaging an adjacent cushion section or other features of the headrest assembly.

FIG. 7 is a flowchart outlining a further aspect of the present disclosure directed to a method (70) comprising installing (72) a headrest into a passenger seat. The headrest includes a first outer cushion section and a second outer cushion section, with a recess located between and adjacent to the first outer cushion section and the second outer cushion section. The central cushion section is articulated and positioned in the recess (74) in a stowed state, and positioned out of the recess (76) in a deployed state.

A further aspect of the present disclosure is directed to a method comprising installing a seat having a headrest into a vehicle. The headrest includes a first outer cushion section and a second outer cushion section, with a recess located between and adjacent to the first outer cushion section and the second outer cushion section. The central cushion section is articulated and positioned in the recess in a stowed state, and positioned out of the recess in a deployed state.

FIG. 8 is a perspective view of an aircraft 80. FIG. 9 is a cross-sectional view of the aircraft 80 shown in FIG. 8, and taken across "line A-A". As shown in FIG. 9, seats 10 of the type shown in FIGS. 1, 2, 3 and 4 are shown positioned in rows and installed in cabin 82 of aircraft 80. Seats 10 include headrest assembly 12 and seat cushions 15. Headrest assemblies 12 include headrest cushion sections 12a, 12b and 12c.

According to further aspects, the headrests, and seats incorporating the headrests, disclosed herein may be operated, for example, manually, automatically or a combination of manual and automatic operation. Further, the headrests may be manipulated directly, or may comprise additional actuation means and/or positioning mechanisms (e.g., levers, switches, gears, cables, servos, motors, etc.) that are in communication with the individual headrest cushion sections for the purpose of moving the cushion segment from a stowed position to a deployed position, or from a deployed position to a stowed position, or to any position between the deployed and stowed positions as desired. Such actuation means may be manual or automated. For example, in an aspect, one or more actuation means may be in communication with an electrical power source, and further may be in communication with a controller. Further, the controller can be in direct or remote communication with the headrest cushions and the seats comprising the headrest cushions and may be operated by seated passengers individually, or may be operated centrally manually or automatically by a non-passenger (e.g., operated collectively by a pilot, flight attendant, or other personnel etc., or by maintenance or repair personnel, etc.).

Regulations governing, for example, a vehicle, such as an aircraft comprising seats further including headrest assemblies and headrest cushion sections according to aspects described herein may require that such headrest cushion sections be placed into a desired position during selected moments or durations that can occur during a vehicle's transit, including, for example, the instances of a passenger aircraft during takeoff and/or landing, etc.

In such instances, and according to further aspects of the present disclosure, the deployed position of the disclosed headrest cushion sections can be dimensioned, positioned and operated to be visible as extending beyond a particular feature, such as for example, the topline of a seat to which a headrest assembly is attached. In this way, sightlines available to attendants will readily reveal a headrest cushion section that is in a deployed state, and that may need to be returned to, for example, a stowed state.

According to aspects of the present disclosure, the advances in passenger comfort afforded passengers are considerable, especially on flights of long duration, as the disclosed headrest assemblies provide passengers with enhanced positioning options for cushioning and supporting the head and neck of a passenger. The advances presented herein afford passengers with superior head and neck support and cushioning, as well as customizable headrest positioning, support and comfort, etc., thus obviating the need for discrete neck pillows. Further, aspects of the present disclosure encourage and support a reclining position of the head of a passenger in search of sleep, facilitating continued comfortable engagement of the head and neck with the headrest system, and making a disruptive forward tilt of the passenger head less likely.

The disclosed passenger seats and headrest assemblies disclosed herein provide the enhanced comfort and support to seat occupants (e.g., passengers, etc.) while meeting or exceeding the overarching demands placed on the manufacture of transport components and larger transport structures comprising such components (e.g., manufacture of aircraft, spacecraft, rotorcraft, terrestrial vehicle, marine vehicle, etc.) such as, for example, concerns and demands relating to weight, cost, quality, fuel consumption, durability and overall aesthetic yet simple design, etc. The presently disclosed headrest assemblies afford such comfort and support, and achieve such a versatility and variety of head and neck positioning that auxiliary pillows, etc., and their attendant weight and storage needs, for example on an aircraft, etc., can be obviated.

While aspects of the present disclosure illustrated herein show a passenger transport seat comprising a headrest assembly having three cushions, further aspects contemplate any practical number of headrest cushion sections being a part of the headrest assemblies disclosed herein, so long as at least one headrest cushion section (and preferably one or more central cushions sections) can be articulated, and moved from a stowed position to a deployed position.

The disclosed apparatuses, systems and methods for manufacturing and installing headrests and seats with such headrests further contemplate incorporating and installing the headrests and seats disclosed herein in transport vehicles, including aircraft, spacecraft, rotorcraft, terrestrial vehicles (including e.g., cars, trains, buses, etc.), surface water borne vehicles, sub-surface water borne vehicles, etc.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A seat comprising:
   a headrest in communication with the seat, said headrest comprising;
   a first outer cushion section;
   a second outer cushion section;
   a recess located between the first outer cushion section and the second outer cushion section;
   an articulated central cushion section;
   a topline extending across an upper perimeter of the seat;
   wherein the articulated central cushion section is positioned in the recess in a stowed state;
   wherein the articulated central cushion section is positioned out of the recess in a deployed state;
   wherein at least a portion of the articulated central cushion section is configured to be positioned above the topline in the deployed state and the articulated central cushion is configured to be positioned below the topline in the stowed state; and
   wherein the articulated central cushion section in the deployed state is adjustable to a plurality of angles relative to the first and second outer cushion sections.

2. The seat of claim 1, wherein the articulated central cushion section comprises an outer surface and an inner surface.

3. The seat of claim 2, wherein at least one of the outer surface and the inner surface comprises a cushioned surface.

4. The seat of claim 1, wherein the articulated central cushion section is in communication with a positioning mechanism.

5. The seat of claim 4, wherein the positioning mechanism comprises a locking feature to maintain the articulated central section in a desired position.

6. The seat of claim 1, wherein the articulated central cushion section comprises at least a first cushion material having a first central cushion material density and a second central cushion material having a second cushion material density, with said first central cushion material density differing from the second central cushion material density.

7. A vehicle comprising the seat of claim 1.

8. The seat of claim 1, wherein at least one of the first outer cushion section and second outer cushion section is articulated;
   wherein at least one of the first outer cushion section and second outer cushion section is configured to be moveable from the stowed state to the deployed state; and
   wherein at least a portion of the first outer cushion section and at least a portion of the second outer cushion section is configured to be positioned above the topline in the deployed state and the first outer cushion and the second outer cushion is configured to be positioned below the topline in the stowed state.

9. The seat of claim 8, wherein the first outer cushion section, the second outer cushion section, and the articulated central cushion are configured to share a common topline.

10. A headrest for a seat comprising;
    a first outer cushion section;
    a second outer cushion section;
    a recess located between and adjacent to the first outer cushion section and the second outer cushion section;
    an articulated central cushion section; and
    a topline extending across an upper perimeter of the headrest;
    wherein the articulated central cushion section is configured to be positioned in the recess in a stowed state; and
    wherein the articulated central cushion section is configured to be positioned out of the recess in a deployed state;
    wherein at least one of the first outer cushion section and second outer cushion section is articulated;

wherein at least one of the first outer cushion section and second outer cushion section is moveable from the stowed state to the deployed state;

wherein at least a portion of the articulated central cushion section is configured to be positioned above the topline in the deployed state and the central cushion is below the topline in the stowed state;

wherein at least a portion of the first outer cushion section and at least a portion of the second outer cushion section is configured to be positioned above the topline in the deployed state and the first outer cushion and the second outer cushion are configured to be positioned below the topline in the stowed state.

11. The headrest of claim 10, wherein the articulated central cushion section in the deployed state is configured to adjust to a plurality of angles relative to the first and second outer cushion sections.

12. The headrest of claim 10 wherein the articulated central cushion section comprises an outer surface and an inner surface.

13. The headrest of claim 12, wherein at least one of the outer surface and the inner surface comprises a cushioned surface.

14. The headrest of claim 10, wherein the articulated central cushion section is in communication with a positioning mechanism.

15. The headrest of claim 14, wherein the positioning mechanism comprises a locking feature to maintain the articulated central section in a desired position.

16. The headrest of claim 10, wherein at least one of the first outer cushion section and second outer cushion section are configured to move from a first position positioned against a seat back to a second position extended away from the seat back.

17. A method comprising:
installing a headrest to a seat, said headrest comprising:
 a first outer cushion section;
 a second outer cushion section;
 a recess located between and adjacent to the first outer cushion section and the second outer cushion section;
 an articulated central cushion section; and
 a topline extending across an upper perimeter of the headrest;
wherein the articulated central cushion section is configured to be positioned in the recess in a stowed state;
wherein the articulated central cushion section is configured to be positioned out of the recess in a deployed state; and
wherein at least a portion of the articulated central cushion section is configured to be positioned above the topline in the deployed state and the central cushion is configured to be positioned below the topline in the stowed state; and
wherein the articulated central cushion section in the deployed state is adjustable to a plurality of angles relative to the first and second outer cushion sections.

18. The method of claim 17, wherein at least one of the first outer cushion section and second outer cushion section is articulated.

19. The method of claim 17, wherein at least one of the first outer cushion section and second outer cushion section is configured to be moveable from a stowed state to a deployed state; and
wherein at least a portion of the articulated central cushion section is configured to be positioned above the topline in the deployed state and the articulated central cushion is configured to be positioned below the topline in the stowed state.

* * * * *